(12) United States Patent
Wakabayashi et al.

(10) Patent No.: US 12,237,533 B2
(45) Date of Patent: Feb. 25, 2025

(54) BATTERY PACK

(71) Applicant: SANYO Electric Co., Ltd., Osaka (JP)

(72) Inventors: Takeaki Wakabayashi, Hyogo (JP); Kensaku Takeda, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 593 days.

(21) Appl. No.: 17/424,481

(22) PCT Filed: Dec. 2, 2019

(86) PCT No.: PCT/JP2019/047084
§ 371 (c)(1),
(2) Date: Jul. 20, 2021

(87) PCT Pub. No.: WO2020/152992
PCT Pub. Date: Jul. 30, 2020

(65) Prior Publication Data
US 2022/0077540 A1 Mar. 10, 2022

(30) Foreign Application Priority Data

Jan. 25, 2019 (JP) ................................ 2019-011544

(51) Int. Cl.
*H01M 50/383* (2021.01)
*H01M 10/0525* (2010.01)
(Continued)

(52) U.S. Cl.
CPC ..... *H01M 50/383* (2021.01); *H01M 10/0525* (2013.01); *H01M 50/213* (2021.01); *H01M 50/24* (2021.01); *H01M 50/247* (2021.01)

(58) Field of Classification Search
None
See application file for complete search history.

(56) References Cited

U.S. PATENT DOCUMENTS 6,278,259 B1 8/2001 Kimoto et al.
9,478,776 B2 10/2016 Lee
(Continued)

FOREIGN PATENT DOCUMENTS

CA 2938316 A1 8/2015
CN 102870273 A 1/2013
(Continued)

OTHER PUBLICATIONS

Office Action dated Oct. 10, 2022, issued in counterpart CN application No. 201980087804.0, with English translation. (9 pages).
(Continued)

*Primary Examiner* — Zhongqing Wei
(74) *Attorney, Agent, or Firm* — WHDA, LLP

(57) ABSTRACT

A battery pack includes battery cell including a discharge valve, and case housing battery cell. Case includes a plurality of fume ventilation holes through which discharged gas jetted from the discharge valve is expelled out of the case, and diffusion gap is provided between discharge valve side end surface of battery cell and a case inner surface, with flameproof cover disposed in diffusion gap. Additionally, expansion space for the discharged gas diffused by flameproof cover is provided inside case, and the direction of expelling the discharged gas is changed to a direction intersecting a direction in which the discharged gas is jetted form the discharge valve. Expansion space communicates with diffusion gap and with fume ventilation holes, and a direction changing portion that changes a direction of the flowing gas is provided at corners of the case. In the battery pack, the discharged gas jetted from the discharge valve collides with flameproof cover, fills expansion space via diffusion gap, is changed in direction in expansion space to diffuse into the plurality of fume ventilation holes, and is expelled out of the case.

11 Claims, 10 Drawing Sheets

(51) Int. Cl.
*H01M 50/213* (2021.01)
*H01M 50/24* (2021.01)
*H01M 50/247* (2021.01)

(56) References Cited

U.S. PATENT DOCUMENTS

2013/0071706 A1* 3/2013 Lee .................... H01M 10/486
429/62
2014/0038020 A1 2/2014 Murata et al.

FOREIGN PATENT DOCUMENTS

| JP | 10-162795 | | 6/1998 |
| JP | 2010-055957 | | 3/2010 |
| JP | 2010055957 A | * | 3/2010 |

OTHER PUBLICATIONS

Extended (Supplementary) European Search Report dated Feb. 10, 2022, issued in couterpart EP Application No. 19911090.9. (7 pages).
International Search Report of PCT application No. PCT/JP2019/047084 dated Mar. 3, 2020.

* cited by examiner

BATTERY PACK

CROSS-REFERENCE TO RELATED APPLICATIONS

This application is a U.S. national stage application of the PCT International Application No. PCT/JP2019/047084 filed on Dec. 2, 2019, which claims the benefit of foreign priority of Japanese patent application No. 2019-011544 filed on Jan. 25, 2019, the contents all of which are incorporated herein by reference.

TECHNICAL FIELD

The present invention relates to a battery pack that houses rechargeable cells in an exterior case.

BACKGROUND ART

In recent years, a battery pack used as a power source for portable electric devices has been further required to have higher output, and non-aqueous electrolyte secondary cells, such as lithium ion cells having excellent power generation efficiency per unit volume, have been adopted as cells making up the battery pack. Although the lithium ion cell has high output, its internal pressure may increase for some reason. In order to ensure safety against an increase in its internal pressure, the cell is provided with a discharge valve that opens at a set pressure to prevent the rupture of the cell. A battery pack has been developed, which has an exterior case provided with a plurality of through holes to improve internal air permeability and facilitate heat dissipation from cells to prevent heat from remaining in the case (see PTL 1).

According to this battery pack, discharged gas from discharge valves can be expelled out of the case through the through holes. However, high-temperature discharged gas expelled from the discharge valves brings a harmful effect that makes safety assurance difficult. In the case of the battery pack having the exterior case housing non-aqueous electrolyte secondary cells, such as lithium ion cells, when the discharge valves are opened, the cells are in an abnormally heated state and vigorously jet high-temperature gas from the discharge valves. The high-temperature gas jetted from the discharge valves has high thermal energy and kinetic energy, thus thermally melting and damaging the exterior case. The damaged exterior case let the high-temperature jetted gas jet out of the case, but the gas jetted outside may ignite upon coming into contact with the air. In addition, a flame generated inside the exterior case escapes to the outside through the holes of the exterior case, in which case ensuring safety becomes further difficult.

To prevent damage to the exterior case caused by the discharged gas from the discharge valves, a battery pack having a heat-resistant spacer disposed counter to discharge valve side end surfaces of the cells has been developed (see PTL 2).

CITATION LIST

Patent Literature

PTL 1: Unexamined Japanese Patent Publication No. 10-162795
PTL 2: Unexamined Japanese Patent Publication No. 2010-55957

SUMMARY OF INVENTION

In the battery pack of PTL 2, a heat resistant plate, such as a mica plate, is disposed between the discharge valve side end surfaces of the cells and the inner surface of the exterior case. This battery pack causes the discharged gas jetted from the discharge valves to collide with the mica plate, thus preventing the gas from being jetted directly onto the exterior case. However, the discharged gas jetted from the discharge valves of the lithium ion cells, which are non-aqueous electrolyte secondary cells, has an extremely high temperature of 400° C. or higher and is jetted out vigorously. For this reason, even after colliding with the mica plate and changing its direction to the surface direction, the discharged gas collides vigorously with the inner surface of the exterior case while maintaining its extremely high temperature. The discharged gas jetted onto the inner surface of the exterior case in such a manner thermally melts and damages the exterior case, and flows through a damaged part to jet out of the case. The battery pack in which the high-temperature discharged gas jetted from the discharged valves jets vigorously out of the case causes smoke generation, ignition, etc., and therefore cannot ensure sufficient safety.

The present invention has been made based on such knowledge of the present inventors. A main object of the present invention is to provide a battery pack which can suppress a harmful effect caused by high-temperature discharged gas jetted from discharge valves of cells and a flame escaping from the case to the outside, thus improving safety.

A battery pack of the present invention includes battery cell 1 having a discharge valve that opens when an internal pressure exceeds a set pressure, and a case 2 housing battery cell 1. Case 2 has a plurality of fume ventilation holes 27 through which discharged gas jetted from the discharge valve is expelled out of the case, and diffusion gap 28 is provided between discharge valve side end surface 1a of battery cell 1 and a case inner surface counter to discharge valve side end surface 1a, with flameproof cover 6 disposed in diffusion gap 28. Additionally, expansion space 25 for the discharged gas diffused by flameproof cover 6 is provided inside case 2, and fume ventilation holes 27 are opened on a case surface where a direction of expelling the discharged gas is changed to a direction intersecting a direction in which the discharged gas is jetted form the discharge valve. Expansion space 25 communicates with diffusion gap 28 and with inner openings of fume ventilation holes 27 on the case inner surface, and direction changing portion 29 that changes a direction of the gas flowing inside case 2 is provided at a corner of the case. The discharged gas jetted from the discharge valve collides with flameproof cover 6, fills expansion space 25 via diffusion gap 28, is changed in direction in expansion space 25 to diffuse into the plurality of fume ventilation holes 27, and is expelled out of the case.

The battery pack described above is characterized in that it prevents the high-temperature discharged gas jetted from the opened discharge valve from vigorously jetting out of the exterior case, thus preventing a harmful effect, such as ignition, to improve safety. This is because of the following process. In the battery pack, the high-temperature discharged gas carrying high energy, which is jetted from the discharge valve, collides with the flameproof cover, spreads around in the diffusion gap, changes its direction to lose some energy, and then flows from the diffusion gap into the expansion space to fill the expansion space. The discharged gas having flowed into the expansion space is then changed in flowing direction by the direction changing portion provided at the corner of the case, which causes the discharged gas to further lose its energy, and the discharged gas flows through a longer flow path in the expansion space to further lose its energy, and then the discharged gas carrying less energy diffuses into the plurality of fume ventilation holes, from which the discharged gas smoothly flows out of the case.

DESCRIPTION OF EMBODIMENTS

Figure 1:
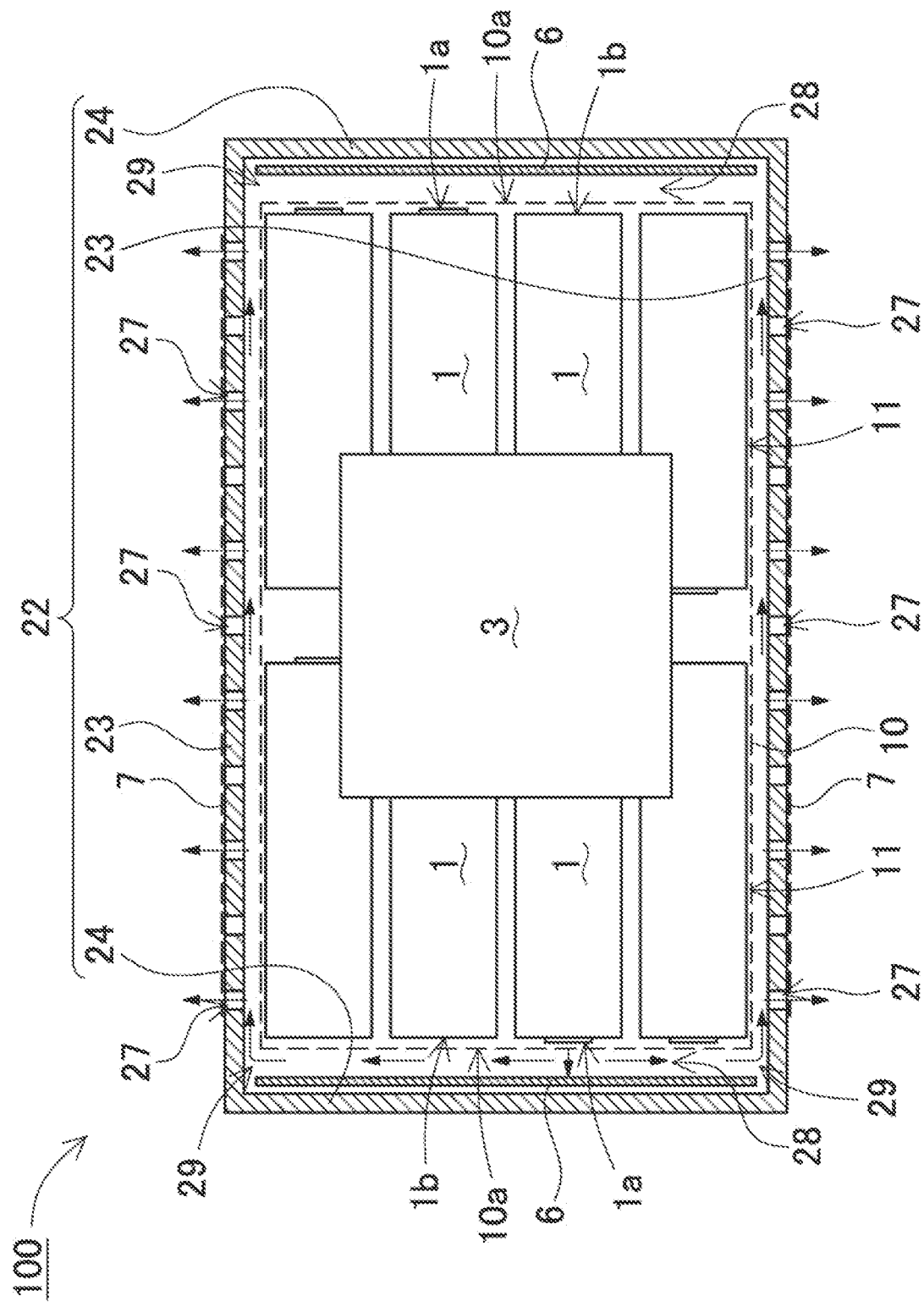
FIG. 1 is a schematic horizontal cross-sectional view showing an internal structure of a battery pack according to a first exemplary embodiment of the present invention.
Figure 2:
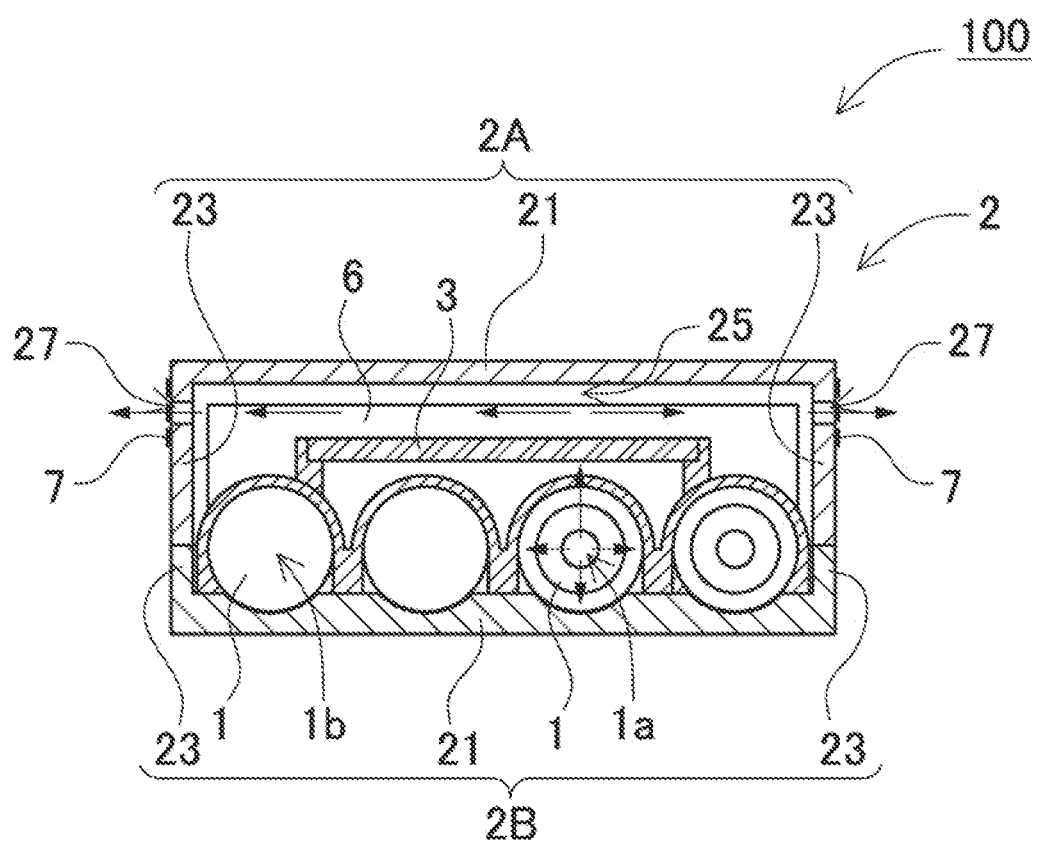
FIG. 2 is a vertical lateral cross-sectional view of the battery pack according to the first exemplary embodiment of the present invention.
Figure 3:
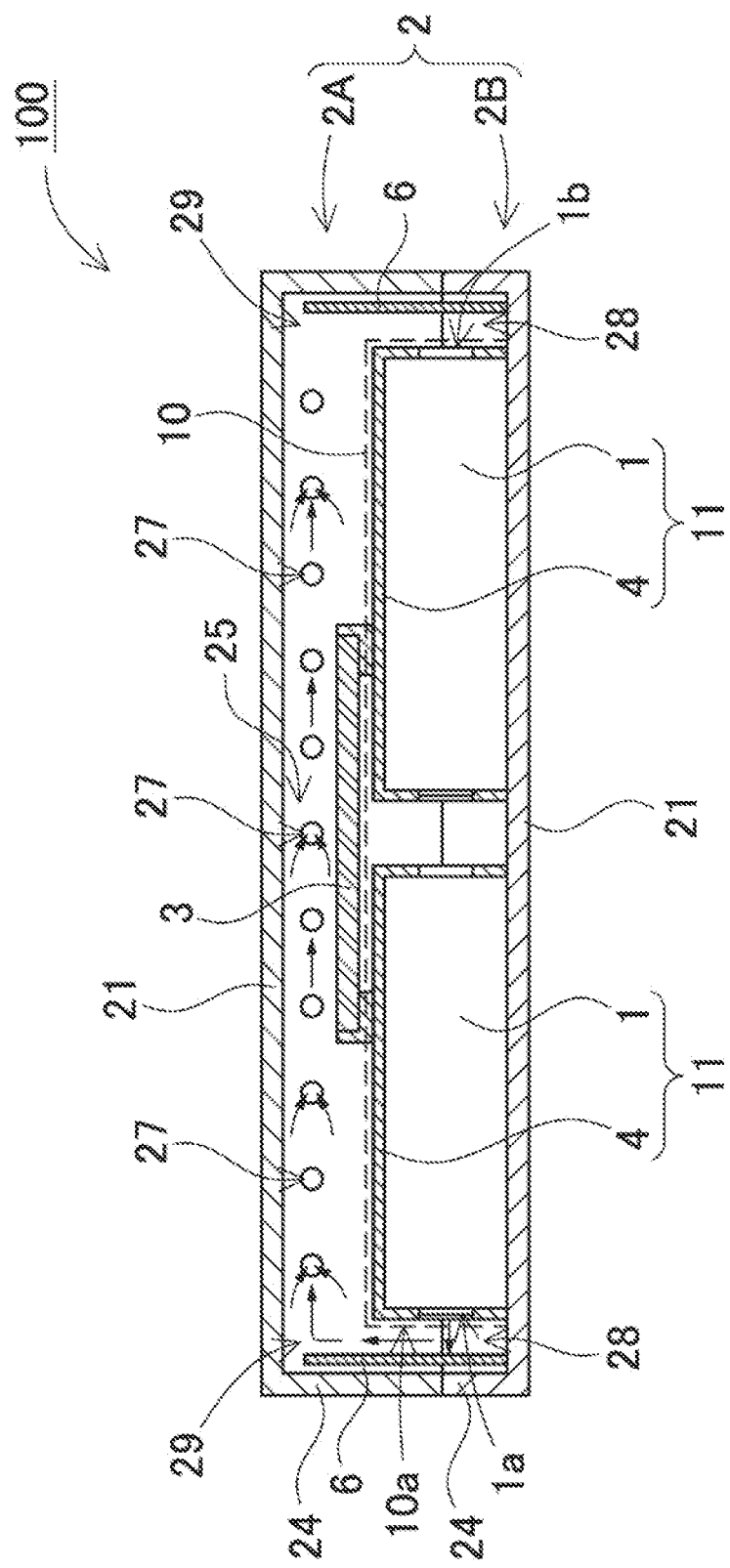
FIG. 3 is a vertical longitudinal cross-sectional view of the battery pack according to the first exemplary embodiment of the present invention.
Figure 4:
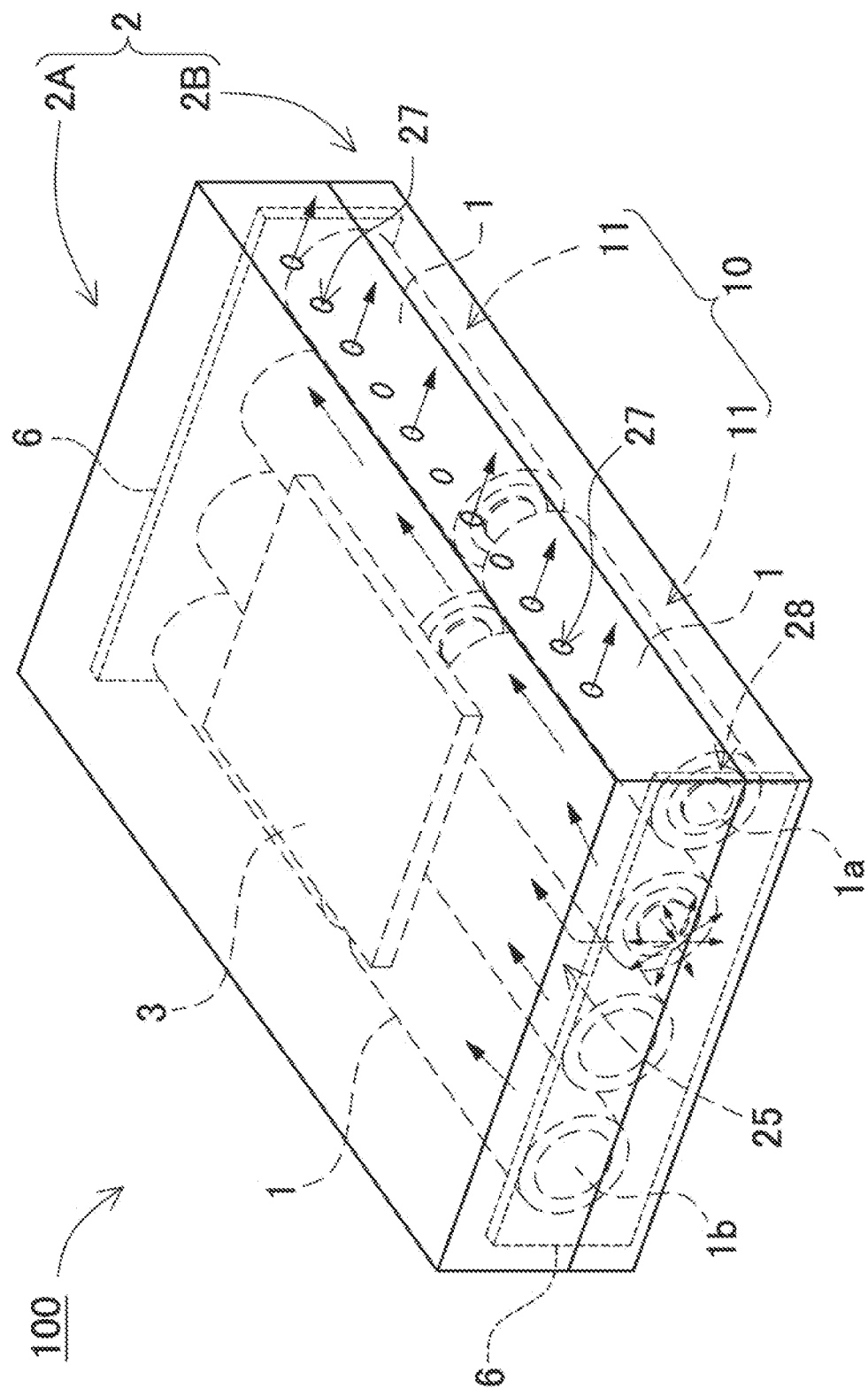
FIG. 4 is a schematic perspective view showing the internal structure of the battery pack according to the first exemplary embodiment of the present invention.

A first aspect of the present invention provides a battery pack including: a battery cell having a discharge valve that opens when an internal pressure exceeds a set pressure; and a case housing the battery cell. In the battery pack, the case has a plurality of fume ventilation holes through which discharged gas jetted from the discharge valve is expelled out of the case, and a diffusion gap is provided between a discharge valve side end surface of the battery cell and a 20) case inner surface counter to the discharge valve side end surface, with a flameproof cover disposed in the diffusion gap. Additionally, an expansion space for the discharged gas diffused by the flameproof cover is provided inside the case, and the fume ventilation holes are opened on a case surface where the direction of expelling the discharged gas is changed to a direction intersecting a direction in which the discharged gas is jetted form the discharge valve. The expansion space communicates with the diffusion gap and with inner openings of the fume ventilation holes on the case inner surface, and a direction changing portion that changes the direction of the gas flowing inside case is provided at a corner of the case. The discharged gas jetted from the discharge valve collides with the flameproof cover, fills the expansion space via the diffusion gap, is changed in direction in the expansion space to diffuse into the plurality of fume ventilation holes, and is expelled out of the case.

According to a second aspect of the present invention, the flameproof cover is made of a heat-resistant plate. The above battery pack allows the flameproof cover to be easily disposed at a fixed position in the case. This is because that the flameproof cover is made of the heat-resistant plate.

According to a third aspect of the present invention, the flameproof cover is made of an inorganic plate, a metal plate, or a heat-resistant plastic plate.

According to a fourth aspect of the present invention, the case has 10 or more fume ventilation holes opened on a side wall, and each fume ventilation hole has an inner diameter of 0.5 mm or more and 3 mm or less.

According to a fifth aspect of the present invention, the plurality of fume ventilation holes are opened on a case surface perpendicular to the flameproof cover.

According to a sixth aspect of the present invention, the case is a rectangular parallelepiped having a surface plate with a peripheral wall formed around the surface plate, and the fume ventilation holes are formed on the peripheral wall of the case.

According to a seventh aspect of the present invention, the case is a rectangular parallelepiped having a surface plate with a peripheral wall formed around the surface plate, and the fume ventilation holes are formed on the surface plate of the case.

According to an eighth aspect of the present invention, the battery cell is a non-aqueous electrolyte secondary cell. Further, according to a ninth aspect of the present invention, the battery cell is a lithium ion cell. Further, according to a tenth aspect of the present invention, the capacity of the battery cell is 5 Ah or less.

According to an eleventh aspect of the present invention, the battery cell is a cylindrical cell, and a plurality of the cylindrical cells with their end surfaces on the same plane are arranged in a parallel position to make up a cell block. The case is a rectangular parallelepiped constructed by forming a peripheral wall around a pair of quadrilateral surface plates, and the peripheral wall includes an end wall located counter to a block end surface of the cell block and side walls on both sides of the cell block. The flameproof cover is disposed between the block end surface and the end wall, and the fume ventilation holes are arranged on either the peripheral wall or the surface plate.

The present invention will hereinafter be described in detail with reference to the drawings. In the following description, terms indicating specific directions and positions (e.g., "upper", "lower", and other terms including these terms) are used when necessary. These terms, however, are used to facilitate understanding of the invention with reference to the drawings, and the technical scope of the present invention is not limited by the meanings of these terms. Parts denoted by the same reference marks in a plurality of drawings represent the same or equal parts or members.

It should be further noted that exemplary embodiments to be descried below merely illustrate specific examples of the technical concept of the present invention, and therefore the present invention is not limited to the exemplary embodiments described below. Further, unless otherwise specified, dimensions, materials, shapes, relative arrangements, and the like of components described below are not intended to limit the scope of the present invention but are intended to be illustrative. The descriptive contents of one exemplary embodiment or example may apply to other exemplary embodiments or examples. In addition, sizes, positional relationships, and the like of members shown in drawings may be exaggerated to give a clear description.

First Exemplary Embodiment

Battery pack 100 shown in FIGS. 1 to 4 includes a plurality of battery cells 1, cell holders 4 in which each battery cell 1 is disposed at a fixed position, circuit board 3 fixed to cell holders 4, flameproof covers 6 each disposed counter to discharge valve openings of battery cells 1, and case 2 in which battery cells 1 disposed at their fixed positions in cell holders 4, circuit board 3, and flameproof cover 6 are arranged.

(Battery Cell 1)

Battery cell 1 is a cylindrical cell. The cylindrical battery has a cylindrical metal case containing electrodes and an electrolytic solution. The metal case has a closed structure in which a sealing plate is airtightly fixed to an opening of an exterior can with a closed bottom. The exterior can is manufactured by press-working a metal plate. The sealing plate is fixed airtightly to the peripheral edge of the opening of the exterior can by caulking, with an insulating packing interposed between the sealing plate and the peripheral edge.

Although not illustrated, battery cell 1 has a discharge valve on the sealing plate in order to prevent a case where the internal pressure of the metal case increases abnormally to damage the metal case. On the sealing plate, the discharge valve has an opening that in its opened state, allows internal gas and the like to flow out. In the battery cell, however, the discharge valve and its opening may be provided on the bottom of the exterior can. When the internal pressure increases to become higher than a set pressure, for example, 1.5 MPa, the discharge valve opens to prevent destruction of the metal case caused by the increasing internal pressure. The discharge valve opens when an abnormal state arises. In a state where the discharge valve opens, therefore, the temperature of battery cell 1 is extremely high. For this reason, the gas and electrolytic solution that are expelled from the opened discharge valve (jetted 30 matters) have an abnormally high temperature. Particularly, in a battery pack in which battery cell 1 is a non-aqueous electrolyte secondary cell, such as a lithium ion cell, the discharged gas has an abnormally high temperature of 400° C. or higher. Furthermore, the lithium ion cell is filled with a non-aqueous electrolytic solution, and when the non-aqueous electrolytic solution with a high temperature is expelled out of the case, the non-aqueous electrolytic solution coming in contact with the air may ignite to carry a more abnormal, higher temperature. Not only in the case of the lithium ion cell but also in the case of other rechargeable cells, the discharged gas jetted from the opened discharge valve has a high temperature. It is thus important, from the viewpoint of improving safety, to reduce the energy of the discharged gas and expel the discharged gas with less energy to outside of the case.

(Cell Holder 4)

In battery pack 100 of FIGS. 1 to 4, the plurality of battery cells 1 are disposed at their fixed positions in cell holders 4, and are arranged in case 2 as cell block 10. Cell block 10 is composed of two cell assemblies 11. In each cell assembly 11, battery cells 1 are placed in cell holder 4 to dispose battery cells 1 at their fixed positions. Cell holder 4 arranges a row of four battery cells 1 in parallel with side walls 23 of case 2. Two cell assemblies 11 are arranged as a row of two cell assemblies 11 along the longitudinal direction of case 2, thus making up cell block 10 in which 4×2=8 battery cells 1 are connected in series and in parallel. In each cell assembly 11, two battery cells 1 with the openings of the discharge valves set counter to end wall 24 are arranged in cell 2. In battery pack 100 of the drawings, cell assembly 11 is composed of four battery cells 1, cell block 10 is composed of two cell assemblies 11, and cell block 10 is disposed in case 2. The battery pack of the present invention, however, does not specify a number and connection conditions of the battery cells housed in the case.

(Circuit Board 3)

Circuit board 3 carries electronic components (not shown) which are connected to battery cells 1 to provide a protection circuit for battery cells 1. The protection circuit is a circuit that prevents overcharge and overdischarge of battery cells 1, or a circuit that prevents overcurrent, or a circuit that cuts off current in a state of an abnormal temperature rise.

(Flameproof Cover 6)

Flameproof cover 6 is disposed on the inner surface of case 2 such that flameproof cover 6 is counter to discharge valve side end surfaces 1a of battery cells 1. To cause discharged gas jetted from the discharge valves to collide with flameproof cover 6 and spread around, diffusion gap 28 is provided between flameproof cover 6 and discharge valve side end surfaces 1a of battery cells 1. In battery pack 100 of FIG. 1, end surfaces of four battery cells 1 are arranged on the same plane along block end surface 10a in such a way that two battery cells 1 have their discharge valve side end surfaces 1a (positive electrodes shown in the drawing) arranged along block end surface 10a while other two battery cells 1 have their electrode end surfaces 1b (negative electrodes), which have no discharge valves, arranged along block end surface 10a. Flameproof cover 6 is disposed on the inner surface of case 2 such that flameproof cover 6 is counter to the whole of block end surface 10a of cell block 10. Since flameproof cover 6 is disposed against discharge valve side end surfaces 1a and electrode end surfaces 1b having no discharge valves, diffusion gap 28 is provided to extend over the whole of block end surface 10a so that the discharged gas expelled from the discharge valves diffuses along the whole of block end surface 10a and flows into expansion space 25.

If diffusion gap 28 is too narrow, the discharged gas cannot flow through it smoothly. It is preferable, for this reason, that diffusion gap 28 be wider than 0.5 mm, and, more preferably, be 1 mm or more. Widening diffusion gap 28, however, results in an increase in the outline of case 2. It is preferable, therefore, that diffusion gap 28 be narrower than 5 mm. Particularly, because the battery pack of the present invention is suitable for use, for example, as a small battery pack for home electrical appliances having built-in battery cells with a relatively small capacity, such as battery cells 1 with a charge capacity of 5 Ah or less, it is important to simplify the overall structure and reduce the size and weight.

Flameproof cover 6 is a heat-resistant plate that is not melted by the discharged gas jetted from the discharge valves. As flameproof cover 6, an inorganic plate made by aggregating inorganic fibers into a sheet or plate shape and a heat-resistant plate made by embedding inorganic fibers in plastic can be used. A mica plate, an inorganic plate made by molding an inorganic material into a plate shape, a metal plate, or the like can also be used as flameproof cover 6. Further, a heat-resistant plate made by molding a plastic with excellent heat resistance properties, for example, such a thermoplastic resin as a nylon resin or a fluororesin, into a plate shape, and a heat-resistant plate made by molding a plastic with heat resistance properties better than that of a silicon resin or a polyimide resin into a plate shape can also be used as flameproof cover 6.

(Case 2)

Case 2 is formed into a rectangular parallelepiped as a whole. Case 2 is formed of a thermoplastic resin, such as polycarbonate. Case 2 houses the plurality of battery cells 1 disposed at their fixed positions in cell holders 4, circuit board 3, and flameproof cover 6. Case 2 of the drawing is composed of upper case 2A and lower case 2B. Lower case 2B and upper case 2A are each provided with peripheral wall 22 formed on the periphery of surface plate 21, which is a quadrilateral and is shown as a rectangle in the drawing. Lower case 2B and upper case 2A are coupled together along their opening end surfaces of peripheral walls 22, the opening end surfaces serving as mating surfaces. Peripheral wall 22 is made up of side walls 23 on both sides, side walls 23 extending in the longitudinal direction of rectangular surface plate 21, and end walls 24 perpendicular to side walls 11. In case 2 of FIGS. 1 and 3, because cell block 10 is disposed such that end wall 24 is located counter to discharge valve side end surfaces 1a of battery cells 1, flameproof cover 6 is disposed on the inner surface of end wall 24.

(Fume Ventilation Hole 27)

Case 2 is provided with a plurality of fume ventilation holes 27. In case 2 of FIGS. 1 to 4, the plurality of fume ventilation holes 27 are formed on side walls 23 of case 2. Fume ventilation holes 27 can be made small to increase the permeation resistance of the discharged gas, and can be increased in number to reduce the total permeation resistance. The inner diameter and the number of fume ventilation holes 27 are, therefore, set properly such that the discharged gas is decreased in energy, and is smoothly dispersed and expelled out. The inner diameter and the number of fume ventilation holes 27 are determined to be optimum one, by taking account of the capacities of battery cells 1, that is, the amount of discharged gas expelled from the opened discharge valves. For example, for cylindrical lithium ion cells commonly called "18650", the inner diameter should preferably be 0.5 mm or more and 3 mm or less, and a number to be 10 or more and 100 or less. However, the present invention does not specify the inner diameter and the number of fume ventilation holes 27, and the inner diameter and the number are determined to be optimum values by taking account of the type, capacity, required safety, and the like of battery cell 1. As indicated by chain lines in FIGS. 1 and 2, fume ventilation holes 27 are covered with a label 7 attached thereto, which is peeled by the discharged gas. In this manner, fume ventilation holes 27 are closed with label 7 to prevent foreign matters from entering fume ventilation holes 27 in a state where the discharge valves are not opened.

(Expansion Space 25)

Case 2 has expansion space 25 provided therein for the discharged gas having collided with flameproof cover 6 and been diffused in diffusion gap 28. Expansion space 25 communicates with diffusion gap 28 and with fume ventilation holes 27, expands and disperses the incoming discharged gas from diffusion gap 28, and changes the direction of flow of the discharged gas to cause it to flow into the plurality of fume ventilation holes 27 in the form of 30 dispersed flows of gas. Expansion space 25 is formed as a gap between the case inner surface and housed components. Case 2 houses cell assemblies 11 in which battery cells 1 are fixed at their fixed positions by cell holders 4, and circuit board 3 fixed to cell holders 4. Expansion space 25 is thus made up of a gap formed between these housed components and the case inner surface and of all communicating gaps formed between battery cells 1, battery holders 4, and circuit board 3, which are the housed components. Expansion space 25 can be increased in volume to allow it to expand the incoming discharged gas from diffusion gap 28 to a greater extent. The volume of expansion space 25 is, therefore, determined to be a volume sufficiently larger than the volume of diffusion gap 28, preferably, a volume 10 times or more that of diffusion gap 28, and more preferably, a volume 50 times or more that of diffusion gap 28.

Expansion space 25 is provided with direction changing portions 29 that change the direction of flow of the discharged gas at corners of case 2. Each direction changing portion 29 changes the direction of the discharged gas to reduce its energy. In case 2 of FIGS. 1 to 3, direction changing portions 29 are provided respectively at the corners where surface plate 21, side walls 23, and end walls 24 join.

Second Exemplary Embodiment

Figure 5:
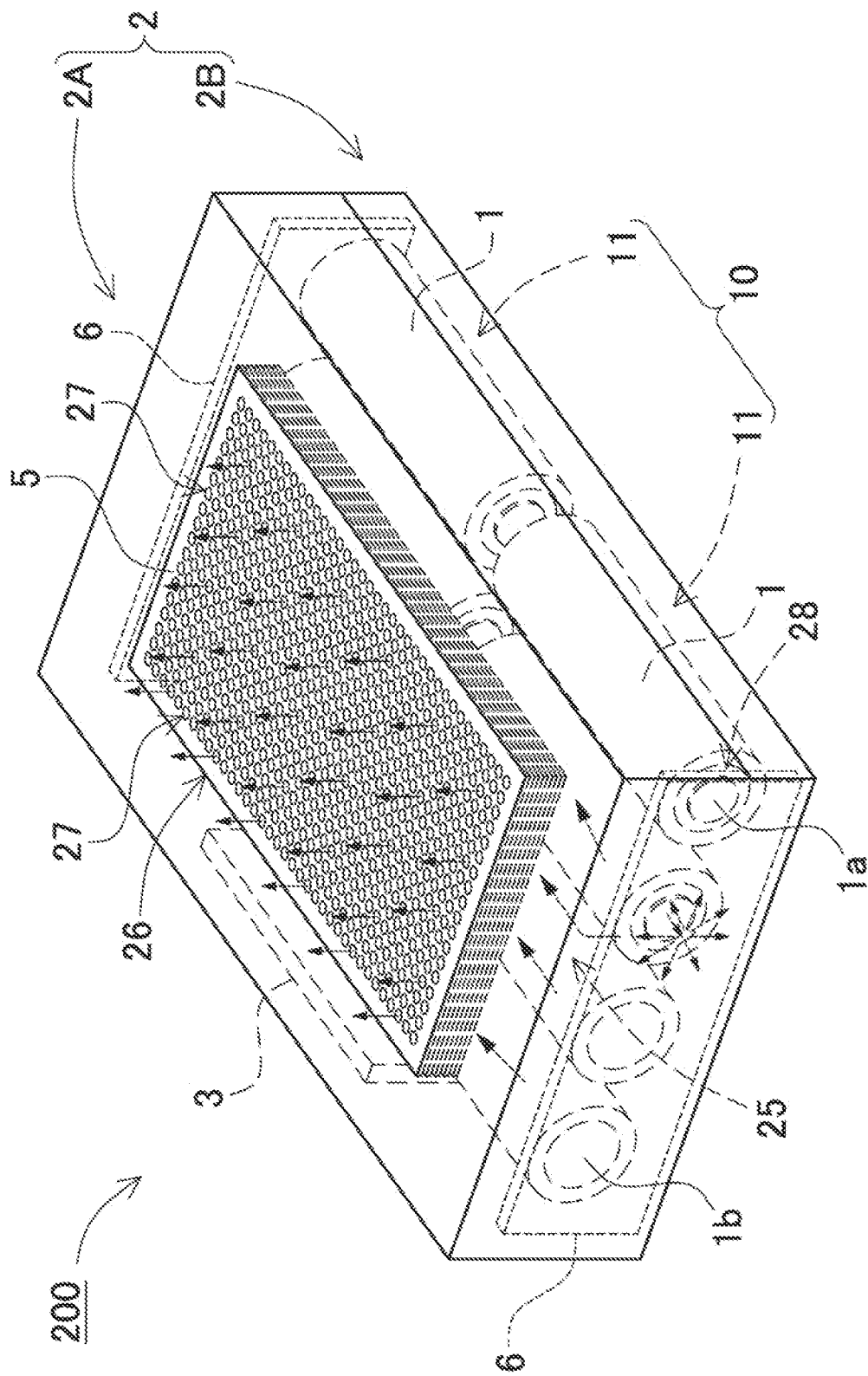
FIG. 5 is a schematic perspective view showing an internal structure of a battery pack according to a second exemplary embodiment of the present invention.
Figure 6:
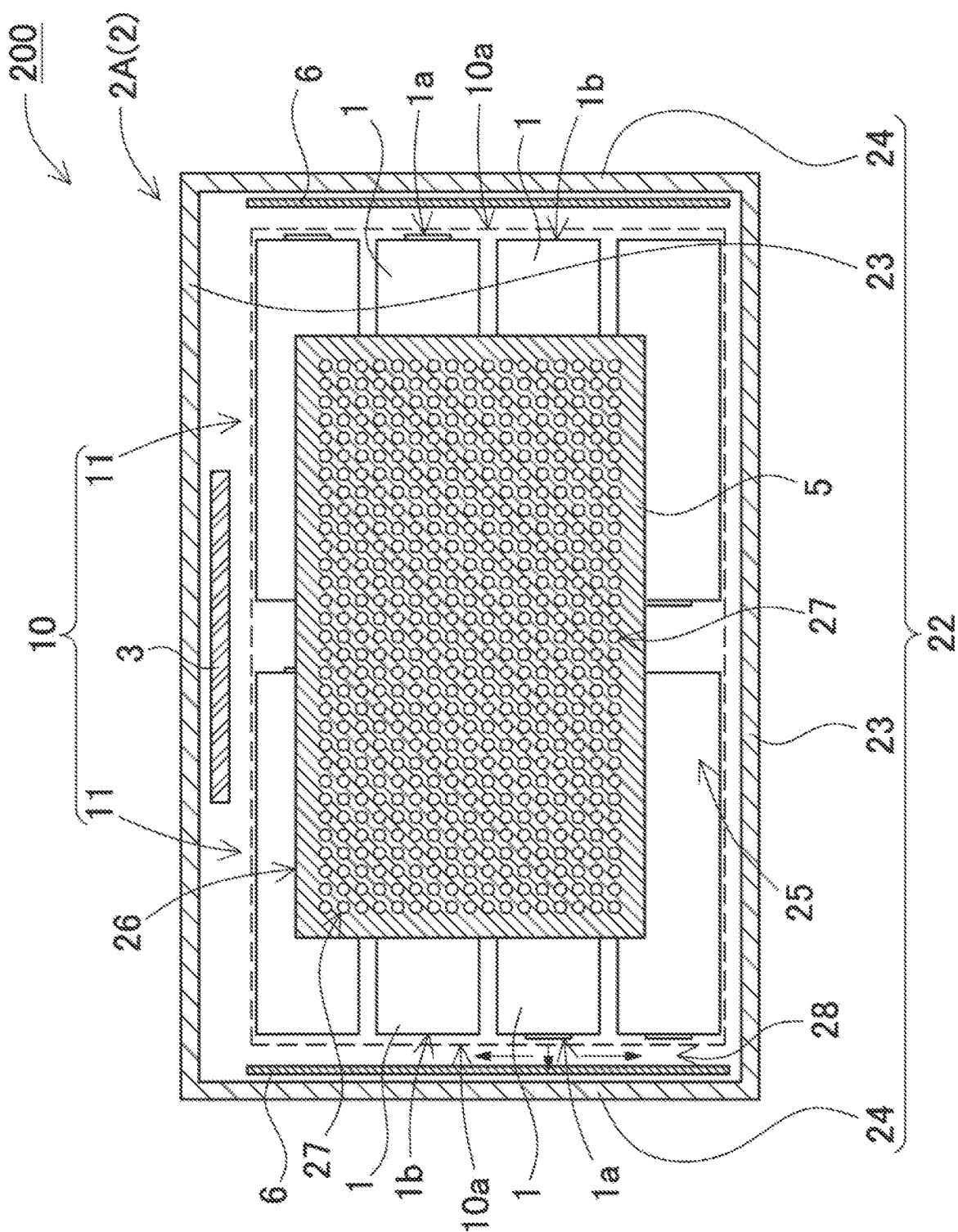
FIG. 6 is a schematic horizontal cross-sectional view showing the internal structure of the battery pack according to the second exemplary embodiment of the present invention.
Figure 7:
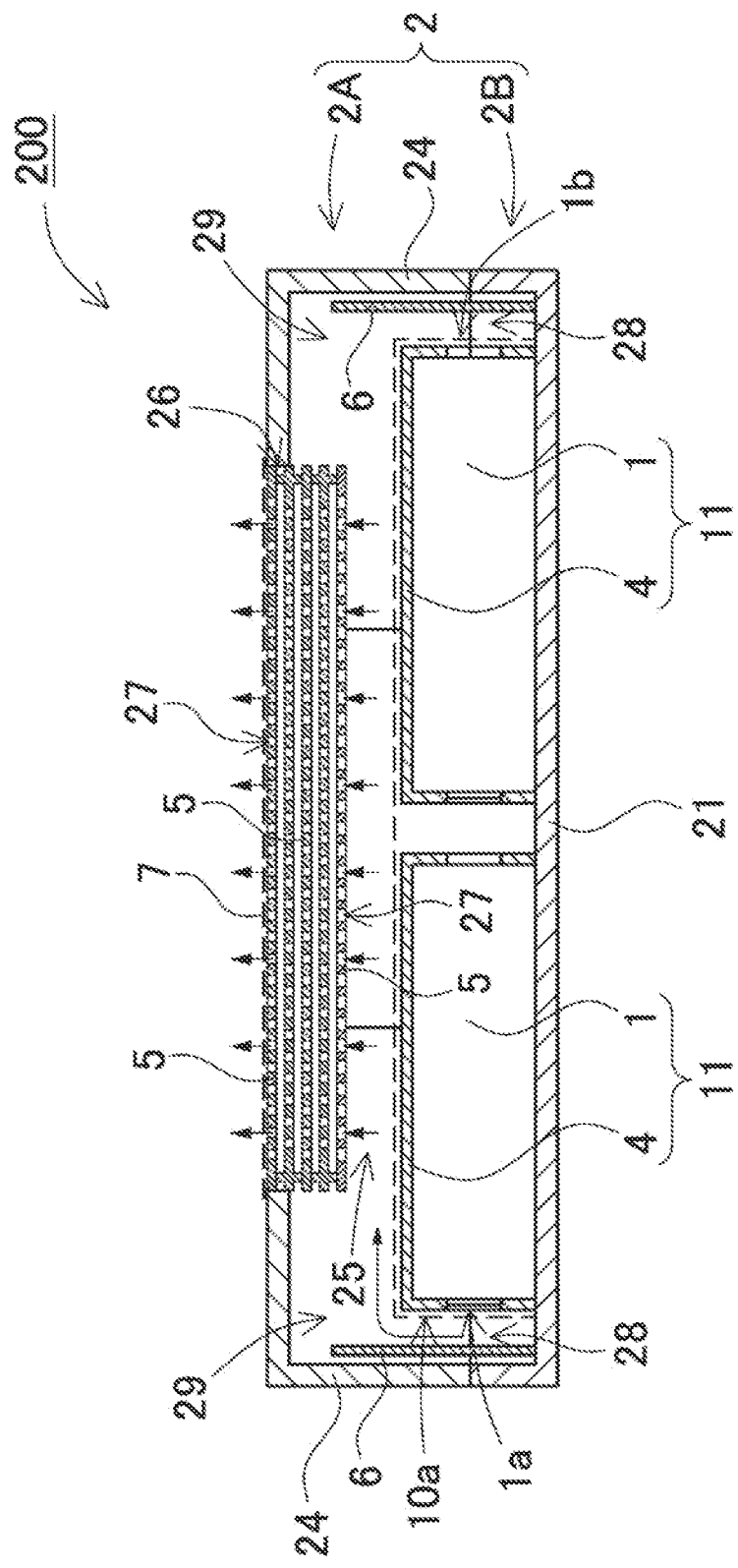
FIG. 7 is a vertical longitudinal cross-sectional view of the battery pack according to the second exemplary embodiment of the present invention.

Battery pack 200 of FIGS. 5 to 7 is identical in structure with battery pack 100 of the first exemplary embodiment except that opening 26 is formed on surface plate 21 of case 2 and is closed with perforated plate 5 provided with fume ventilation holes 27. In case 2 of FIGS. 5 to 7, opening 26 is formed on nearly the whole surface of surface plate 21 of upper case 2A. In this battery pack 200, opening 26 of case 2 can be enlarged to smoothly expel the discharged gas. The area of opening 26 is thus determined to be, preferably, 40% or more of surface plate 21, and more preferably, to be 50% or more of surface plate 21. On case 2 of the drawing, quadrilateral opening 26 is formed on quadrilateral surface plate 21 to increase the area of opening 26.

Opening 26 is closed with perforated plate 5 provided with fume ventilation holes 27 allowing the discharged gas to flow therethrough. Perforated plate 5 is bonded and fixed to surface plate 21 via an adhesive or welding structure, or fixed to the same via a fitting structure. Perforated plate 5 is fixed in such a way as to create no gap between perforated plate 5 and opening 26. A plurality of perforated plates 5 are stacked such that the discharged gas is expelled as its energy is reduced. Between stacked perforated plates 5, expansion gaps 8 for the discharged gas are formed. Stacked perforated plates 5 have their fume ventilation holes 27 arranged at non-counter locations where fume ventilation holes 27 of respective perforated plates 5 are not counter to each other, thus forming a structure in which the discharged gas does not flow linearly through the plurality of perforated plates 5 to be expelled out of the case. Perforated plate 5 is made by molding plastic into a plate shape and forming a number of fume ventilation holes 27 on the plate shape.

Perforated plate 5 is made by using plastic with heat resistance properties capable of reducing the energy of the discharged gas and expelling the discharged gas to the outside. Such perforated plate 5 can safely expels the discharged gas carrying high energy. It is ideal that perforated plate 5 be formed of heat-resistant plastic that is not thermally deformed by the temperature of the discharged gas. In the structure in which the plurality of perforated plates 5 are stacked with expansion gaps 8 provided therebetween, however, all perforated plates 5 do not always have to have heat resistance properties that prevent perforated plates 5 from being thermally deformed by the discharged gas. This is because that even if perforated plates 5 on the inner side are thermally deformed, perforated plates 5 on the outer side are kept in a condition where they can reduce the energy of the discharged gas and expel the discharged gas through a number of fume ventilation holes 27 remaining working, in which case the safety of battery pack 200 can be ensured. A plurality of perforated plates 5 stacked together are characterized in that they can be produced in large quantities at low cost by injection molding a thermoplastic resin, such as polycarbonate. However, the present invention does not specify a plastic making up perforated plate 5. Perforated plate 5 can be molded from a thermoplastic resin with more excellent heat resistance, for example, such a thermoplastic resin as a nylon resin or a fluororesin, and can also be molded from a plastic with more excellent heat resistance, such as a silicone resin or a polyimide resin.

Figure 8:
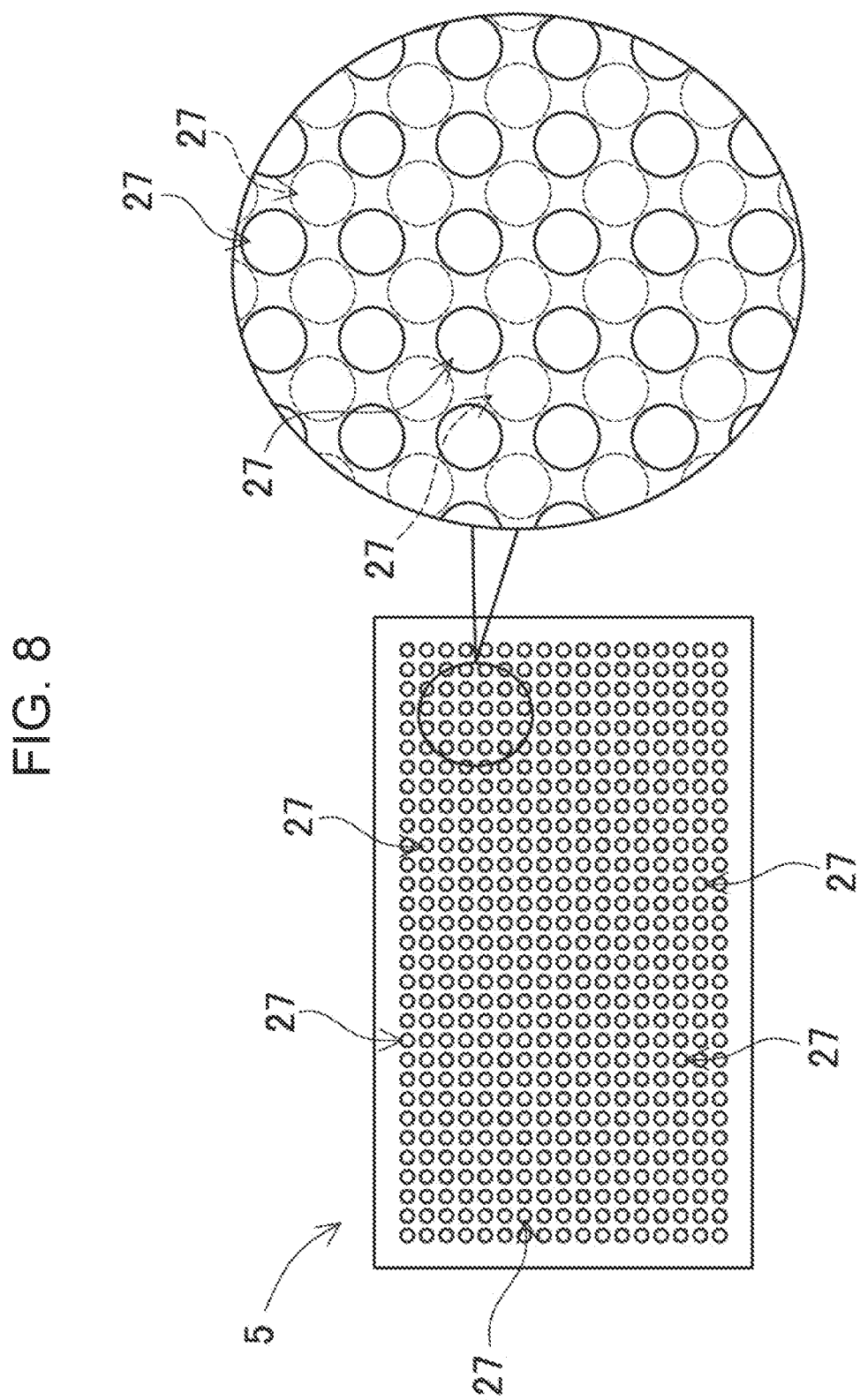
FIG. 8 is a partially enlarged plan view showing a stacked state of perforated plates.

In perforated plate 5 shown in a plan view of FIG. 8, fume ventilation holes 27 of circular shapes are arranged at intersections of a checkerboard lattice so that vertical and horizontal pitches of fume ventilation holes 27 are made constant. Fume ventilation holes 27 can be made small to increase the permeation resistance of the discharged gas, but too small fume ventilation holes 27 do not allow the discharged gas to be smoothly expelled out of case 2. It is thus preferable that the inner diameter of fume ventilation holes 27 be 1 mm or more and 3 mm or less. At perforated plate 5 stacked on the innermost side of case 2, the discharged gas vigorously jetted from the discharge valves first permeates perforated plate 5. This perforated plate 5 is provided with fume ventilation holes 27 made larger than those of other perforated plates 5. This allows the discharged gas jetted from the discharge valves to smoothly flow through fume ventilation holes 27. However, fume ventilation holes 27 of all perforated plates 5 may be made equal in size. The discharged gas having flowed through fume ventilation holes 27 jets into expansion gap 8, where the discharged gas expands adiabatically. Adiabatic expansion of the discharged gas in expansion gap 8 causes the temperature of the discharged gas to drop. In a structure in which three or more perforated plates 5 are stacked, a plurality of layers of expansion gaps 8 are formed. In this structure, every time the discharged gas flows through fume ventilation holes 27 into expansion gap 8, the discharged gas expands adiabatically, which causes the temperature of the discharged gas to drop.

Perforated plate 5 can be formed to make it thicker, that is, to make fume ventilation holes 27 longer, which increases the permeation resistance of the discharged gas. It is thus preferable that the thickness of perforated plate 5 be 1 mm or more and 3 mm or less. However, the present invention does not limit the inner diameter of fume ventilation holes 27 and the thickness of perforated plate 5 to respective ranges of the inner diameter and thickness described above. It may be possible that many smaller fume ventilation holes or a few larger fume ventilation holes are provided and the perforated plate is made thinner or thicker to create a structure in which the discharged gas with its energy reduced is expelled. Pitches of fume ventilation holes 27 are set as values ensuring that fume ventilation holes 27 of perforated plates 5 counter to each other are arranged in non-counter locations and that any part of fume ventilation holes 27 is not disposed in counter locations in stacked perforated plates 5. As shown in the plan view of FIG. 8, perforated plate 5, in which fume ventilation holes 27 form a checkerboard lattice pattern, has fume ventilation holes 27 arranged such that four fume ventilation holes 27 formed on stacked perforated plates 5 do not overlap each other around fume ventilation hole 27 formed on one perforated plate 5. However, even if a structure in which fume ventilation holes 27 formed on perforated plates 5 counter to each other are arranged in locations where fume ventilation holes 27 partially overlap each other is made, such a structure can be adopted as a structure in which the energy of the discharged gas is reduced and the discharged gas is safely expelled to the outside. This is because that most of the discharged gas having flowed through fume ventilation holes 27 collides with the surfaces of stacked perforated plates 5 and lose energy.

Figure 9:
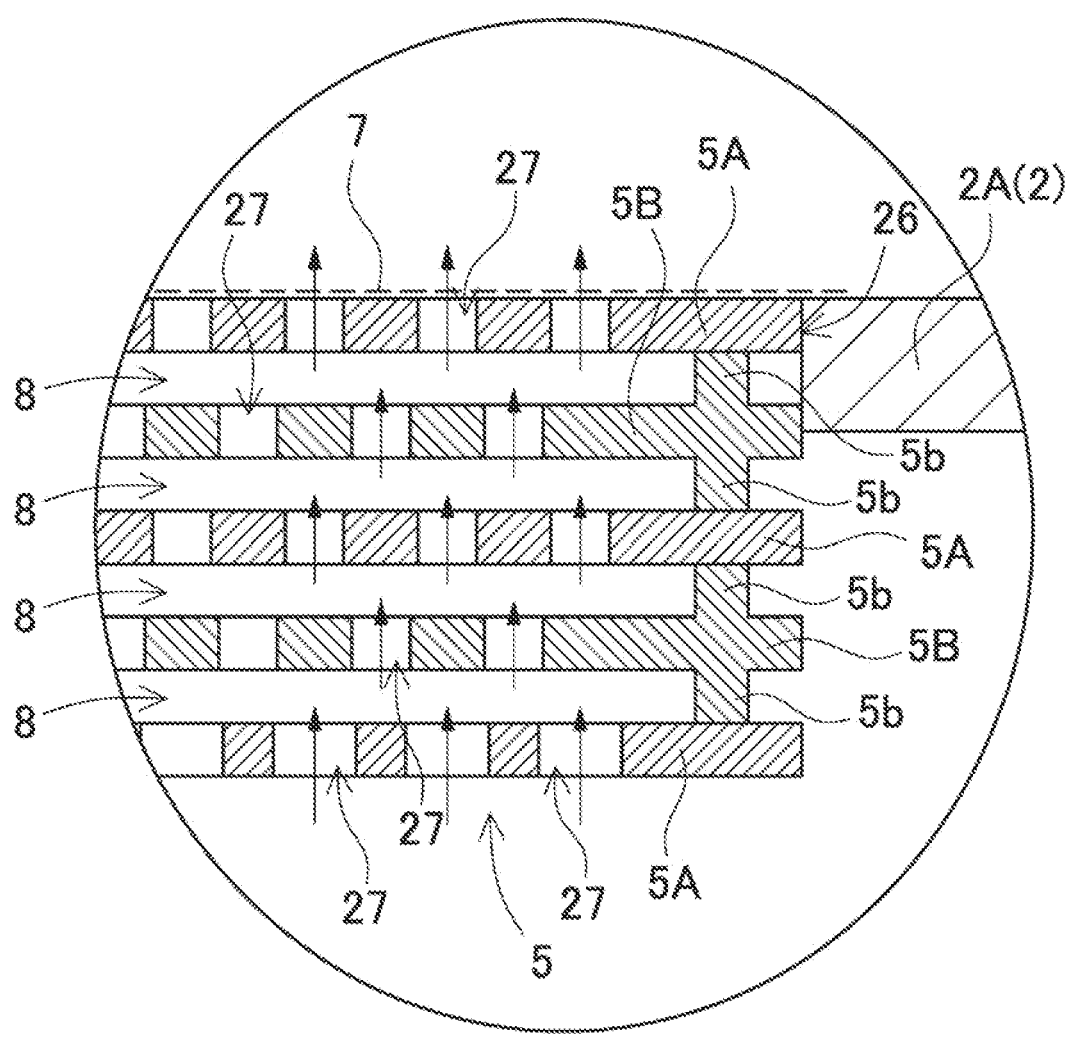
FIG. 9 is an enlarged cross-sectional view showing the stacked state of the perforated plates.
Figure 10:
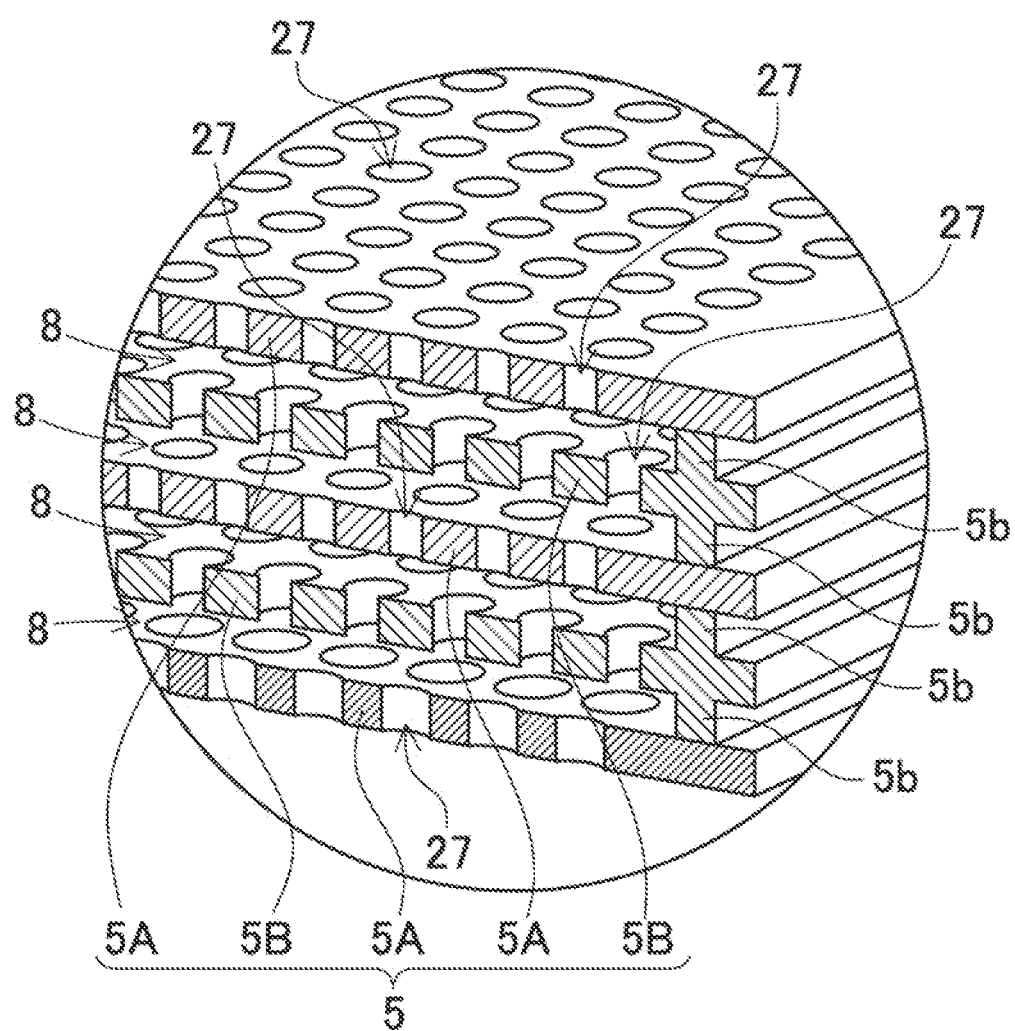
FIG. 10 is an enlarged cross-sectional perspective view showing the stacked state of the perforated plates.

As shown in FIGS. 9 and 10, perforated plates 5 are each provided with protrusions 5b integrally molded on its surface such that stacked perforated plates 5 form expansion gaps 8 of a certain size. Protrusions 5b shown in the drawing are spacer ribs molded integrally along side edges of perforated plates 5. The height of each protrusion 5b, which is the spacer rib, determines the size of expansion gap 8. According to perforated plates 5 shown in a cross-sectional view of FIG. 9, expansion gap 8 is substantially equal in thickness with perforated plate 5. Expansion gap 8, however, may be made narrower or wider than perforated plate 5. Narrow expansion gap 8 increases the permeation resistance of the discharged gas to allow the energy of the discharged gas to be reduced more effectively, in which case, however, smoothly expelling the discharged gas becomes difficult. Widening expansion gap 8, on the other hand, leads to a case where a plurality of perforated plates 5 stacked together have a large thickness as a whole. The size of expansion gap 8 is, therefore, determined to be a size that allows the discharged gas to be smoothly expelled as the total thickness of stacked perforated plates 5 is kept small as much as possible and that prevents a harmful effect, such as ignition, to allow safely expelling the discharged gas. For example, the size of expansion gap 8 is determined to be 2 mm or more and 5 mm or less.

Protrusions 5b are arranged on the outer peripheries of perforated plates 5 in an interspersed manner and are arranged also in the centers of perforated plates 5 when necessary, so that perforated plates 5 can be stacked with expansion gaps 8 kept constant in size. FIGS. 9 and 10 show perforated plates 5 stacked as five layers of perforated plates 5. Perforated plates 5 shown in these drawings consist of two types of perforated plates 5 alternately stacked together, the two types of perforated plates 5 being plane perforated plates 5A and intermediate perforated plates 5B. Plane perforated plates 5A and intermediate perforated plates 5B are provided with fume ventilation holes 27 that are formed at locations not counter to each other, i.e., non-counter locations. Each intermediate perforated plate 5A is provided with protrusions 5b integrally molded and protruding from both surfaces. Perforated plates 5 of such a shape can be stacked such that two types of perforated plates 5 are stacked alternately, that fume ventilation holes 27 are arranged at non-counter locations, and that expansion gaps 8 of a constant size are provided between perforated plates 5. Perforated plates 5 shown in FIGS. 9 and 10 consist of three plane perforated plates 5A and two intermediate perforated plates 5B that are stacked together, thus forming a five-layer stack structure. Plane perforated plate 5A are placed respectively on both surfaces and in the middle of the stack structure, while intermediate perforated plates 5B are placed respectively between plane perforated plates 5A. This structure is made by alternately stacking plastic perforated plates 5 molded into two types of shapes, and can be formed as a stack structure in which the number of stacked plates is an odd. In perforated plates 5 shown in FIGS. 9 and 10, fume ventilation holes 27 formed on plane perforated plate 5A located on the innermost side are made larger than fume ventilation holes 27 of other perforated plates 5. In this manner, in battery pack 100 in which fume ventilation holes 27 of perforated plate 5 located on the innermost side of case 2 are made large, perforated plate 5 located on the innermost side is molded separately. In this case, therefore, perforated plates 5 molded into three kinds of shapes are stacked to form three or more odd-numbered layers.

In battery pack 200, diffusion gap 28 and expansion space 25 are provided inside case 2. In battery pack 200, the discharged gas jetted from the discharge valves collides with flameproof cover 6 and flows into diffusion gap 28 and expansion space 25, where the energy of the discharged gas is reduced. The discharged gas then flows through fume ventilation holes 27 formed on stacked perforated plates 5 and through expansion gaps 8 formed between perforated plates 5, which further reduces the energy of the discharged gas, and is expelled out of case. At fume ventilation holes 27, the permeation resistance of the discharged gas flowing through fume ventilation holes 27 reduces the energy of the discharged gas. At expansion gaps 8, the discharged gas having flowed through fume ventilation holes 27 collides with the surfaces of perforated plates 5, which reduces the energy of the discharged gas.

In battery pack 200 shown in a schematic perspective view of FIG. 5, a jetting direction of the discharged gas jetted from battery cells 1 and a direction in which the discharged gas flows through fume ventilation holes 27 of perforated plates 5 intersect each other. Battery cells 1 are set in a position in which battery cells 1 extend in the longitudinal direction of rectangular surface plate 21, and perforated plates 5 are arranged parallel with surface plate 21 in such a way as to close opening 26 formed on surface plate 21. Battery cells 1 jet the discharged gas from the opened discharged valves in a direction parallel with the surface of surface plate 21, and fume ventilation holes 27 allow the discharged gas to flow therethrough in a direction perpendicular to surface plate 21 to expel the discharged gas. Specifically, the direction in which the discharged gas is jet out and the direction in which the discharged gas is expelled through fume ventilation holes 27 intersect each other, that is, are perpendicular to each other, as shown in the drawing. The discharged gas is thus changed in direction in case 2 and is expelled to the outside.

The discharged gas jetted from the discharge valves inside case 2 flows in directions indicated by arrows in FIGS. 5 to 7 and is expelled out of case 2. Battery cells 1 have the openings of the discharge valves disposed counter to end wall 24 of case 2. The discharged gas is, therefore, jetted from the discharge valves toward end wall 24. Because flameproof cover 6 is disposed inside relative to end wall 24, the discharged gas collides with flameproof cover 6 and spreads around in diffusion gap 28. The discharged gas having collided with flameproof cover 6 and been diffused in diffusion gap 28 flows into expansion space 25 and is further diffused. As indicated by arrows in the drawing, the discharged gas flowing into expansion space 25 collides with the inner surface of case 2, is dispersed, is changed in direction, and is expelled from fume ventilation holes 27 to the outside. As indicated by arrows in the drawing, the discharged gas collides with the inner surface of the case 2, is dispersed, is changed in direction to lose some energy, flows through fume ventilation holes 27 and expansion gaps 8, where the discharged gas further loses its energy, and is finally expelled out of case 2. The structure in which the discharged gas with reduced energy is expelled out of case 2 suppresses a harmful effect, such as ignition that occurs outside case 2, and improves safety.

INDUSTRIAL APPLICABILITY

The present invention can be applied effectively to a battery pack that safely expels discharged gas.

REFERENCE MARKS IN THE DRAWINGS

100, 200: battery pack
1: battery cell
1*a*: discharge valve side end surface
1*b*: electrode end surface
2: case
2A: upper case
2B: lower case
3: circuit board
4: cell holder
5: perforated plate
5A: plane perforated plate
5B: intermediate perforated plate
5*b*: protrusion
6: flameproof cover
7: label
8: expansion gap
10: cell block
10*a*: block end surface
11: cell assembly
21: surface plate
22: peripheral wall
23: side wall
24: end wall
25: expansion space
26: opening
27: fume ventilation hole
28: diffusion gap
29: direction changing portion

The invention claimed is:

1. A battery pack comprising:
a battery cell including a discharge valve that opens when an internal pressure of the battery cell exceeds a set pressure; and
a case housing the battery cell,
wherein the case has a plurality of fume ventilation holes through which discharged gas jetted from the discharge valve is expelled out of the case,
wherein the case comprises an upper case and a lower case coupled together along an interface where respective opening ends of the upper case and the lower case meet,
wherein the interface is counter to a discharge valve side end surface of the battery cell,
the battery pack further comprises a flameproof cover disposed along the inner surface of the case and facing the interface of the upper case and the lower case, wherein the flameproof cover has a plate-shape, and is positioned on the inner surface of the case with a diffusion gap defined between the flameproof cover and the discharge valve side end surface,
an expansion space for the discharged gas diffused by the flameproof cover is provided inside the case,
a direction of expelling the discharged gas through the fume ventilation holes intersects a direction in which the discharged gas is jetted from the discharge valve,
the expansion space communicates with the diffusion gap and with inner openings of the fume ventilation holes on the inner surface of the case,
a direction changing portion of the gas flowing inside case is provided at a corner of the case, and
the discharged gas jetted from the discharge valve collides with the flameproof cover, fills the expansion space via the diffusion gap, is changed in direction in the expansion space to diffuse into the plurality of fume ventilation holes, and is expelled out of the case.

2. The battery pack according to claim 1, wherein the flameproof cover is a heat-resistant plate.

3. The battery pack according to claim 2, wherein the flameproof cover is an inorganic plate, a metal plate, or a heat-resistant plastic plate.

4. The battery pack according to claim 1, wherein
the case has ten or more of the fume ventilation holes opened on a side wall, and
each of the fume ventilation holes has an inner diameter of 0.5 mm or more and 3 mm or less.

5. The battery pack according to claim 1, wherein the plurality of fume ventilation holes are opened on a case surface perpendicular to the flameproof cover.

6. The battery pack according to claim 5, wherein
the case is a rectangular parallelepiped including a surface plate with a peripheral wall around the surface plate, and
the plurality of fume ventilation holes are provided on the peripheral wall of the case.

7. The battery pack according to claim 5, wherein
the case is a rectangular parallelepiped including a surface plate with a peripheral wall around a surface plate, and
the plurality of fume ventilation holes are provided on the surface plate of the case.

8. The battery pack according to claim 1, wherein the battery cell is a non-aqueous electrolyte secondary cell.

9. The battery pack according to claim 8, wherein the battery cell is a lithium ion cell.

10. The battery pack according to claim 8, wherein a capacity of the battery cell is 5 Ah or less.

11. The battery pack according to claim 1, wherein
the battery cell is a cylindrical cell, wherein the cylindrical cell is one of a plurality of cylindrical cells, and a cell block comprising the plurality of the cylindrical cells including end surfaces on a same plane arranged in a parallel position,
the case is a rectangular parallelepiped including a peripheral wall around a pair of quadrilateral surface plates,
the peripheral wall includes an end wall located facing to a block end surface of the cell block and side walls on both sides of the cell block,
the flameproof cover is disposed between the block end surface and the end wall, and
the plurality of fume ventilation holes are arranged on either the peripheral wall or at least one of the pair of quadrilateral surface plates.

* * * * *